United States Patent [19]
Hoffa

[11] Patent Number: 5,289,685
[45] Date of Patent: Mar. 1, 1994

[54] FUEL SUPPLY SYSTEM FOR A GAS TURBINE ENGINE

[75] Inventor: Robert J. Hoffa, Fairfield, Ohio

[73] Assignee: General Electric Company, Cincinnati, Ohio

[21] Appl. No.: 976,864

[22] Filed: Nov. 16, 1992

[51] Int. Cl.⁵ .................................... F02C 7/228
[52] U.S. Cl. ............................ 60/739; 60/746
[58] Field of Search .............. 60/39.36, 733, 734, 60/739, 746, 747, 39.826

[56] References Cited

U.S. PATENT DOCUMENTS

| | | | |
|---|---|---|---|
| 2,833,115 | 5/1958 | Clarke et al. | 60/39.65 |
| 2,996,884 | 2/1960 | Johnson et al. | |
| 3,020,717 | 2/1962 | Pearce | |
| 3,032,990 | 5/1962 | Rogers | 60/39.32 |
| 3,587,231 | 6/1971 | Fisher et al. | 60/39.28 |
| 3,714,778 | 2/1973 | Howald | |
| 3,720,058 | 3/1973 | Collinson et al. | |
| 3,724,207 | 4/1973 | Johnson | |
| 3,910,035 | 10/1975 | Juhasz et al. | |
| 3,915,387 | 10/1975 | Caruel et al. | |
| 3,943,705 | 3/1976 | DeCorso et al. | 60/39.74 R |
| 3,980,233 | 9/1976 | Simmons et al. | 239/400 |
| 3,999,378 | 12/1976 | Tatem et al. | 60/746 |
| 4,027,473 | 3/1976 | Baker | 60/39.28 |
| 4,092,826 | 6/1978 | Pask | 60/39.74 |
| 4,100,733 | 7/1978 | Striebel et al. | |
| 4,107,918 | 8/1978 | Andrew et al. | |
| 4,180,972 | 1/1980 | Herman et al. | 60/39.32 |
| 4,194,358 | 3/1980 | Stenger | 60/39.06 |
| 4,302,932 | 12/1981 | Kuznetsov et al. | 60/39.32 |
| 4,305,255 | 12/1981 | Davies et al. | 60/746 |
| 4,373,342 | 2/1983 | Willis et al. | 60/748 |
| 4,455,840 | 6/1984 | Matt et al. | 60/737 |
| 4,499,735 | 2/1985 | Moore et al. | 60/746 |
| 4,603,548 | 8/1986 | Ishibashi et al. | 60/39.06 |
| 4,716,719 | 1/1988 | Takahashi et al. | 60/39.06 |
| 4,817,389 | 4/1989 | Holladay et al. | 60/739 |
| 4,903,478 | 2/1990 | Seto et al. | 60/39.281 |
| 4,918,926 | 4/1990 | Nikkanen | 60/751 |
| 4,949,538 | 8/1990 | Iasillo et al. | 60/733 |
| 4,991,398 | 2/1991 | Clark et al. | 60/748 |
| 4,993,221 | 2/1991 | Idelchik | 60/39.03 |
| 5,016,443 | 5/1991 | Shimizu et al. | 60/737 |
| 5,020,329 | 6/1991 | Eckstedt et al. | |
| 5,024,055 | 6/1991 | Sato et al. | 60/39.27 |
| 5,077,967 | 1/1992 | Widener et al. | 60/39.02 |
| 5,099,644 | 3/1992 | Sabla et al. | 60/267 |
| 5,154,060 | 10/1992 | Walker et al. | 60/746 |

OTHER PUBLICATIONS

GE Component Test Program to Reduce Risk in F414 Engine Development, Aviation Week and Space Technology Jun. 29, 1992, pp. 64–65.

Engine Testing of a Prototype Low NOx Gas Turbine Combustor Presented at the International Gas Turbine and Aeroengine Congress and Exposition, Cologne, Germany, Jun. 1–4, 1992.

Progress in $NO_x$ and CO Emission Reduction of Gas Turbines: ASME Transactions Oct. 21–25, 1990, pp. 1–7.

Second Generation Low-Emission Combustors for ABB Gas Turbines: ASME Transactions Jun. 11–14, 1990, pp. 1–9.

*Primary Examiner*—Louis J. Casaregola
*Attorney, Agent, or Firm*—Bernard E. Shay; Jerome C. Squillaro

[57] ABSTRACT

In a gas turbine engine, fuel is supplied to a fuel metering valve which is connected to a shutoff valve. The shutoff valve supplies fuel to a manifold. Fuel flow between the manifold and main fuel nozzles is controlled by fuel staging valves while the pilot nozzle is connected directly to the manifold by a fuel line which may include an orifice. The orifice is designed to match the flow in the pilot nozzle with the flow in main nozzles when the fuel staging valve is on.

3 Claims, 3 Drawing Sheets

FUEL SUPPLY SYSTEM FOR A GAS TURBINE ENGINE

The following commonly assigned applications are directed to related subject matter and are being concurrently filed with the present application, the disclosures of which are hereby incorporated herein by reference.

The following commonly assigned application Ser. No. 07/976,876, filed Nov. 16, 1992, is directed to related subject matter and is being concurrently filed with the present application, the disclosures of which is hereby incorporated herein by reference.

The present invention relates, in general to a novel fuel supply control system for gas turbine engines and more particularly to a novel fuel supply control system including controllable valves to reduce Nitrous-Oxides ($NO_x$).

BACKGROUND OF THE INVENTION

In a gas turbine engine, air is compressed and combined with a fuel (liquid or gaseous) in a combustion chamber. The air fuel mixture is ignited and the energy from the resulting expansion is used to turn a turbine. In such engines, the output power is proportional to fuel flow and, more particularly, is proportional to the sum of the fuel mass flow rate and the air mass flow rate through the combustor.

As a byproduct of the combustion process, gas turbine engines, such as those used to power electrical generators may emit certain pollutants, such as nitrous oxides ($NO_x$). $NO_x$ may be limited by controlling the flame temperature of the burners in the combustor. As the flame temperature is increased, the $NO_x$ produced by the engine also increases. Further, if the average flame temperature becomes too high, it may damage the combustor or other parts of the engine. In contrast, if the average flame temperature becomes too low, the burners may be extinguished, resulting in a "lean blow out". It would, therefore, be advantageous to maintain the flame temperature within a predetermined range to ensure that the $NO_x$ output is limited and that the combustor does not "blow out" or damage the engine.

Combustor flame temperature in a gas turbine engine is proportional to the fuel to air ratio in the combustor. Flame temperature, being proportional to the fuel to air ratio, increases as the fuel to air ratio increases. Therefore, an increase in fuel flow or decrease in airflow through the combustor will normally result in an increase in flame temperature.

In contrast, any decrease in fuel flow or increase in airflow will reduce the flame temperature.

It would, therefore, be advantageous to maintain a substantially constant flame temperature by adjusting the fuel to air ratio within the combustor. For example, the airflow to the combustor might be increased as the fuel flow increases to meet increased output power demands. Alternatively the airflow may be decreased as the fuel flow is decreased for reduced output power demand. However, in many gas turbine engines, the airflow is not adjustable over a sufficient range to maintain a substantially constant flame temperature.

In gas turbine engines, of the type described herein, the fuel to air ratio in the combustor may be adjusted by changing a number of variables. For example, the local fuel to air ratio may be adjusted by selectively controlling the flow of fuel to individual nozzles in the combustor.

SUMMARY OF THE INVENTION

In a fuel system for an annular combustor including one or more main fuel nozzles, fuel is supplied to a primary fuel metering valve which is connected to a primary fuel shutoff valve. The primary fuel shutoff valve supplies fuel to a fuel manifold. Fuel flow between the manifold and the main fuel nozzles is controlled by multiple fuel staging valves while the pilot nozzles are connected directly to the manifold.

Further, in accordance with the present invention, as the fuel flow is increased or decreased, the flame temperature is held within the predetermined range by selectively opening the fuel staging valves, thus stepping through predetermined sequences or patterns.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
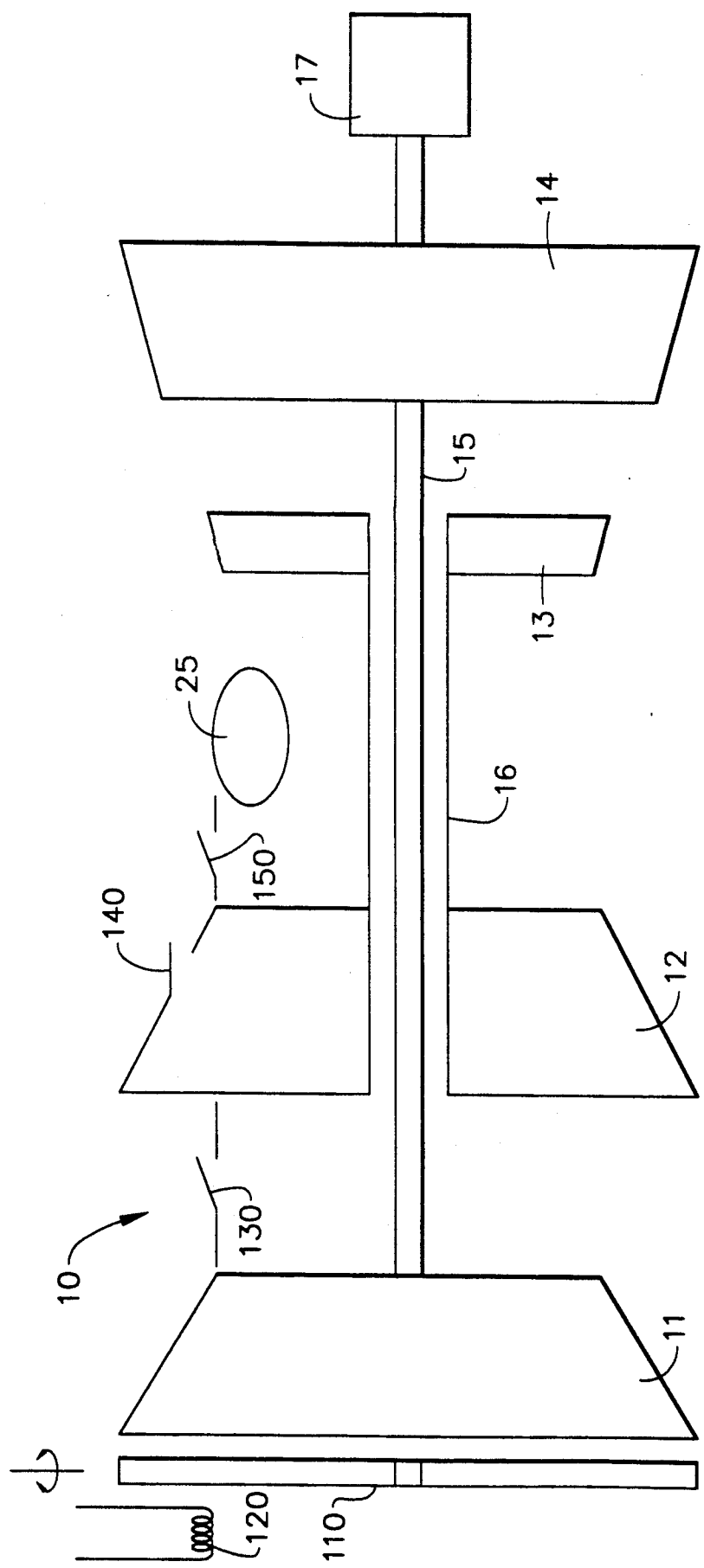
FIG. 1 is a cross section of a gas turbine engine according to the present invention.

Referring now to the drawings in detail, wherein identical numerals indicate the same elements throughout the figures, FIG. 1 depicts a gas turbine engine 10 of the type having a low pressure compressor 11, a high pressure compressor 12 downstream of low pressure compressor 11, a combustor 25 downstream of high pressure compressor 12, a high pressure turbine 13 downstream of combustor 25, and a low pressure turbine 14 downstream of high pressure turbine 13. The standard configuration for engines of this type is a dual concentric shafting arrangement, whereby low pressure turbine 14 is drivingly connected to low pressure compressor 11 by a first shaft 15 and high pressure turbine 13 is similarly drivingly connected to high pressure compressor 12 by a second shaft 16 external and concentric to shaft 15. In the gas turbine depicted in FIG. 1, low pressure turbine 14 is connected directly to low pressure compressor 11 and a load 17. An example of such an engine is manufactured by General Electric Company of Evendale, Ohio under the designation LM6000. While the combustor of the present invention is described as being utilized with the gas turbine engine of FIG. 1, it will be understood that it can also be utilized in gas turbine engines of other configurations.

In one embodiment of the invention, the gas turbine engine of FIG. 1 will include mechanisms and apparatus adapted to control the flow of air through the engine. In FIG. 1, inlet guide vanes 110 are rotatable to limit air flow to low pressure compressor 11. Inlet air heater 120 may be used to change the temperature of the inlet air. Variable bleed valve 130 may be used to bleed air flow between low pressure compressor 11 and high pressure compressor 12. Eighth stage bleed valve 140 may be used to bleed air from the eight stage of compressor 12. Compressor discharge bleed valve 150 may be used to bleed air between the high pressure compressor and combustor 25.

Figure 2:
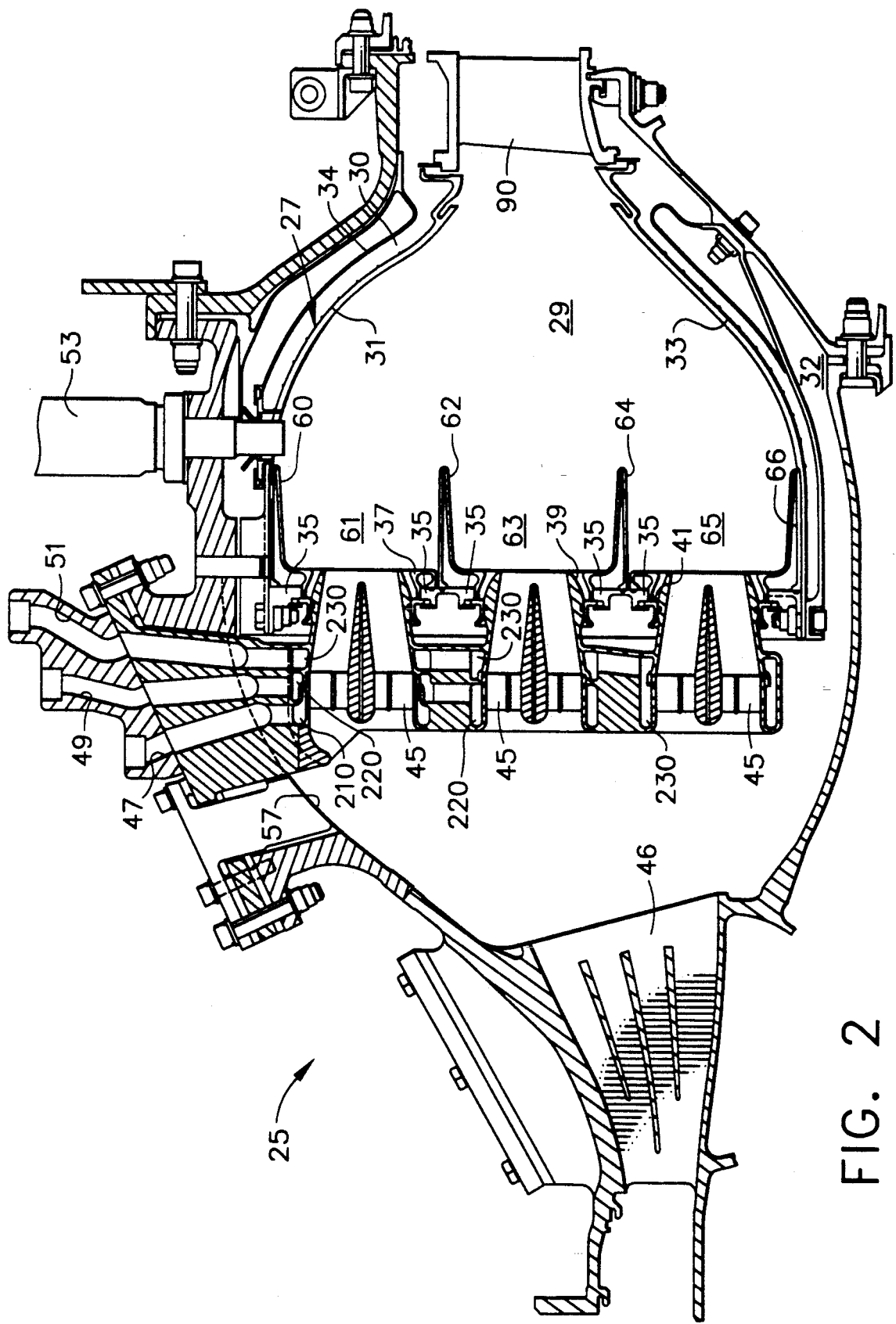
FIG. 2 is a side view cross section of a combustor according to the present invention.

FIG. 2 depicts combustor 25 according to the present invention which comprises a hollow body 27 defining a combustion chamber 29 therein. Hollow body 27 is generally annular in form and is comprised of an outer liner 31, an inner liner 33, and a dome plate 35. In the present annular configuration, the dome plate 35 of hollow body 27 includes three separate radial annuli (also referred to as "rings") —— outer annulus 37, middle annulus 39, and inner annulus 41.

Combustor 25 incorporates a dome and fuel technique which utilizes the lean premix concept during all stages of combustor operation. By "lean premix," it is meant that the fuel/air mixture contains more air than is required to fully combust the fuel, or an equivalence ratio of less than one. It has been found that an equivalence ratio of 0.4 to 0.7 is preferred. This is done by utilizing approximately 80-90% of the total combustion air, which is that supplied by diffuser 46, to provide low fuel to air ratios (even at maximum power where the fuel flow rate is very high). In order to accommodate this high percentage of dome air flow, a large number of swirl cups or premixers are required. Thus, the three domes or annuli 37, 39, and 41 are provided in the triple annular configuration as shown. It is noted that annuli such as 37, 39 and 41 are often referred to as "domes".

Fuel-air mixers 45 are mounted in the openings in dome 35 which are arranged to form annuli 37, 39 and 41. In order to operate combustor 25 during the various stages of engine operation while maintaining a lean premixture of fuel and air, the mixers 45 of the various annuli may be staged (either circumferentially, radially, or a combination of circumferential and radial staging) so that only some are supplied fuel at any given time. The middle annulus 39 is the so-called pilot annulus. Mixers 45 therein will be supplied with fuel during all phases of operation of combustor 25. Thereafter, the mixers of outer annulus 37 and inner annulus 41 will have fuel supplied thereto as required by the power requirements of the gas turbine engine.

Heat shields are provided to segregate the individual annuli. Specifically, outer annulus 37 includes heat shield 60 to help insulate outer liner 31. Middle annulus 39 includes heat shields 62 and 64 to segregate it from outer annulus 37 and inner annulus 41, respectively. Inner annulus 41 includes heat shield 66 in order to insulate inner liner 33 from flames burning therein. In order to accommodate heat shield 60, igniter 53 preferably is located immediately downstream therefrom.

It should be noted that inner liner 33 and outer liner 31 are unitary in construction and do not have nuggets or other cooling holes therethrough. In this way, less cooling air is required in outer passages 30 and inner passage 32. A baffle 34 is provided in outer passage 30 in order to assist in the flow of cooling air therethrough to turbine nozzle 90.

In the embodiment of FIG. 2, Fuel is injected into the air stream at the trailing edge of the mixer 45 through small holes in hollow counter-rotating vanes. Fuel mixes with air, then exits the fuel nozzle, or pre-mixer, into combustion zones 61, 63 and 65 then ignites and burns at a controlled local fuel to air ratio. Fuel is supplied to each mixer through nozzle feeder tubes 47, 49 and 51 which supply fuel to mixers 40 through nozzle plenums 210, 220 and 230 respectively.

For the purposes of the remainder of this discussion, an air fuel mixer in combination with its fuel supply mechanism will be referred to as a fuel nozzle. For example, in the embodiment of FIG. 2 fuel mixer 45 in annulus 37 would comprise an outer nozzle.

Figure 3:
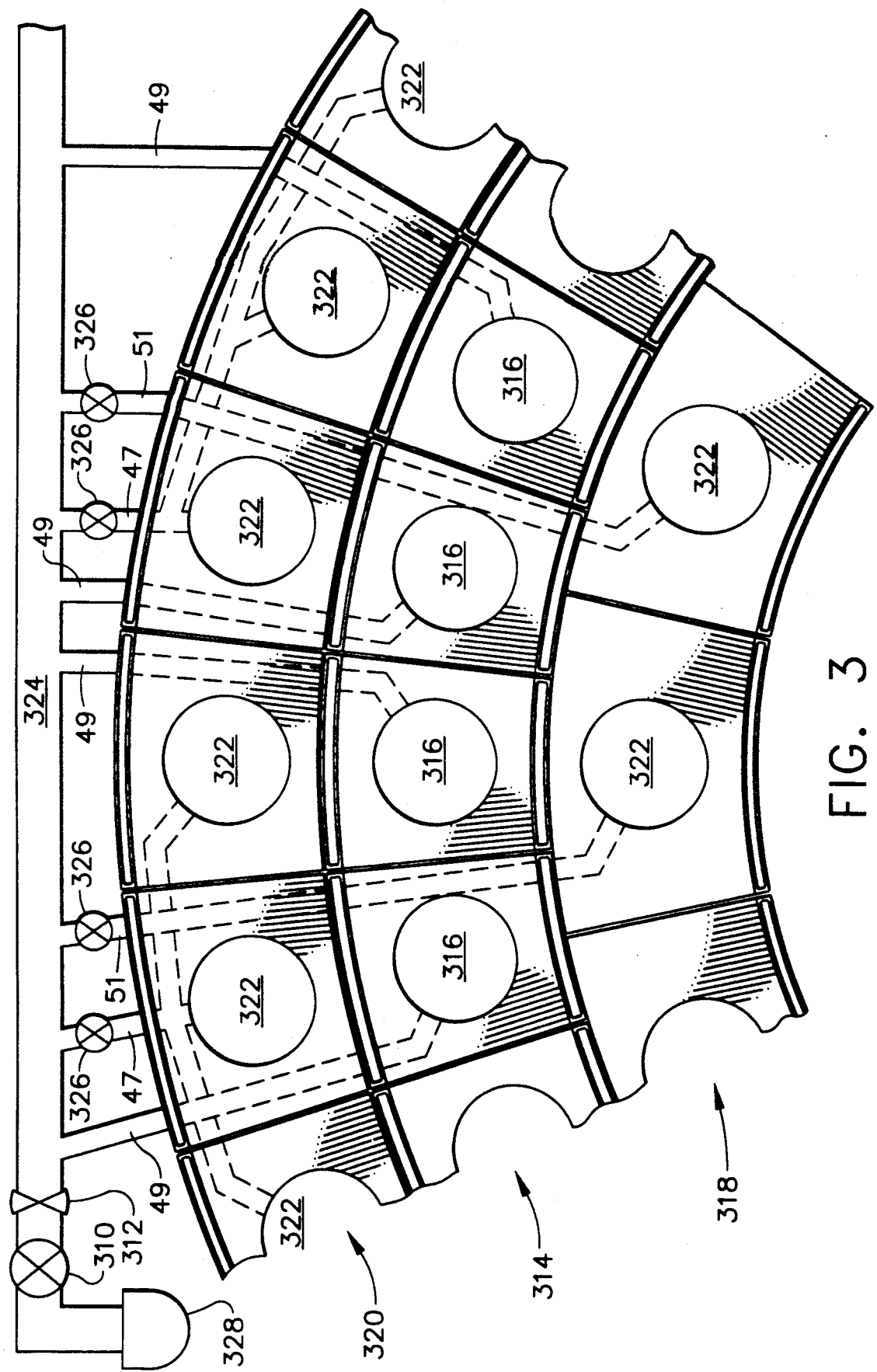
FIG. 3 is a partial end view schematic cross section of a combustor according to the present invention.

In an annular combustor, fuel nozzles are arranged around the gas turbine in annuli. In a dual annular combustor there are two such annuli and three annuli in a triple annular combustor. FIG. 3 is a schematic representation illustrating the flow of fuel to individual fuel nozzles. In the embodiment of the present invention, illustrated in FIG. 3, the combustor comprises a triple annular combustor including a central annulus 314 of pilot nozzles 316 and an inner 318 and outer 320 annulus of main nozzles 322. In the embodiment of FIG. 3, pilot nozzles 316 are connected directly to fuel manifold 324 through feeder tubes 49. Fuel flow to fuel manifold 324 may be regulated by primary fuel metering valve 310 in combination with primary fuel shutoff valve 312 which receives fuel from fuel source 328 (e.g., a fuel pump and fuel tank). When primary fuel shutoff valve 312 is turned on, the flow rate of fuel to the pilot nozzles is controlled by primary fuel metering valve 310. In this embodiment, the inner and outer main fuel nozzles 322 are connected to the fuel manifold through individual fuel staging valves 326 and feeder tubes 47 and 51. Fuel staging valves 326 are individually addressable and may be turned on or off (i.e., opened or closed) individually or in groups. By turning main nozzles 322 on or off, the total burner area may be adjusted to change the fuel to air ratio in the combustor. In order to ensure that the total burner area is accurately controlled, nozzles 322 are normally turned on or off in predetermined groupings referred to herein as patterns.

It may be advantageous to use one fuel staging valve 326 to control a plurality of main nozzles. Where the number of main nozzles on the outer annulus exceeds the number of main nozzles on the inner annulus, as, for example, in the embodiment of FIG. 3, it may be advantageous to control a plurality (e.g., three) of the main nozzles on the outer annulus using a single fuel staging valve 326.

In FIG. 3 when the combustor is ignited by turning on primary fuel shutoff valve 312 and opening primary fuel metering valve 310, pilot nozzles are connected directly to the fuel manifold 324 and, therefore, in the embodiment described herein, all of the nozzles in the central annulus 314 of the combustor are ignited immediately. When any of the nozzles in the combustor are ignited, the area of the active nozzles may be referred to as the nozzle area.

As fuel flow is increased by, for example, opening primary fuel metering valve 310, it is advantageous to increase the burner area (decreasing the fuel to air ratio in the combustor) since reducing the fuel to air ratio helps to reduce the $NO_x$ content of the engine exhaust. Burner area may be increased by, for example, turning on (i.e., igniting) one or more of main fuel nozzles 322. In one embodiment of the present invention, main fuel nozzles 322 on inner annulus 318 are ignited in predetermined patterns as the fuel flow is increased. Once all the main fuel nozzles on inner annulus 318 are ignited, main nozzles 322 on outer ring 320 may be selectively ignited in predetermined patterns. The inner and outer main fuel nozzles 322 are selectively ignited by selectively opening and closing fuel staging valves 322.

As previously discussed, by controlling fuel flow to individual nozzles and, thus, holding the flame temperature within a predetermined range, the present invention limits the production of $NO_x$. In addition, holding the flame temperature within a predetermined range reduces the possibility of lean blowout or high temperature damage.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

We claim:

1. A gas turbine engine fuel control comprising:
 a triple annular combustor comprising a central ring of pilot fuel nozzles and inner and outer rings of main fuel nozzles,
 a fuel manifold connecting said combustor to a fuel source;
 a fuel metering valve controlling the flow of fuel from said fuel source to said fuel manifold;
 a plurality of conduits connecting said pilot nozzles to said manifold; and
 a plurality of selectively controllable fuel staging valves controlling the flow of fuel from said manifold to said main nozzles.

2. The fuel control of claim 1 wherein:
 fuel flow to each of said main fuel nozzles on said inner ring is controlled by one of said staging valves; and
 fuel flow to a plurality of said main fuel nozzles on said outer ring is controlled by one of said staging valves.

3. The fuel control of claim 2 wherein:
 said plurality of said main fuel nozzles comprises three of said main fuel nozzles.

* * * * *